United States Patent [19]
Lee

[11] Patent Number: 6,111,829
[45] Date of Patent: Aug. 29, 2000

[54] APPARATUS AND METHOD FOR ADJUSTING A REFERENCE VOLTAGE TO DETECT A TRAVERSE SIGNAL BASED ON THE TYPES OF OPTICAL MEDIUM

[75] Inventor: Jeong Jun Lee, Kyungki-Do, Rep. of Korea

[73] Assignee: LG Electronics Inc., Seoul, Rep. of Korea

[21] Appl. No.: 09/481,394

[22] Filed: Jan. 12, 2000

Related U.S. Application Data

[62] Division of application No. 08/890,754, Jul. 11, 1997.

[30] Foreign Application Priority Data

Jul. 13, 1996 [KR] Rep. of Korea .................. 96-28334

[51] Int. Cl.[7] ................................................ G11B 7/09
[52] U.S. Cl. ............................ 369/44.28; 369/44.25
[58] Field of Search ......................... 369/44.27, 44.28, 369/44.29, 32, 58, 44.25

[56] References Cited

U.S. PATENT DOCUMENTS

| | | | |
|---|---|---|---|
| 4,519,056 | 5/1985 | Kimoto et al. | 369/58 |
| 5,003,521 | 3/1991 | Yoshida et al. | 369/44.27 |
| 5,416,758 | 5/1995 | Ito | 369/44.28 |
| 5,442,604 | 8/1995 | Osada | 369/44.11 |
| 5,548,569 | 8/1996 | Shimizume et al. | 369/44.28 |
| 5,592,448 | 1/1997 | Suzuki et al. | 369/44.28 |
| 5,774,438 | 6/1998 | Park et al. | 369/58 |

*Primary Examiner*—Muhammad Edun
*Attorney, Agent, or Firm*—Birch, Stewart, Kolasch & Birch, LLP

[57] ABSTRACT

A track traverse signal detecting apparatus and method adjust the level of a reference voltage by calculating a mean value of a track traverse signal, or by adjusting the frequency of the phase of the track traverse signal. The track traverse signal detecting apparatus and method further determine whether an optical medium being processed is a CD or a DVD, and adjust the level of a reference voltage based on this determination. Therefore, in the case of a track jump or random access, the track access operation is performed accurately.

16 Claims, 5 Drawing Sheets

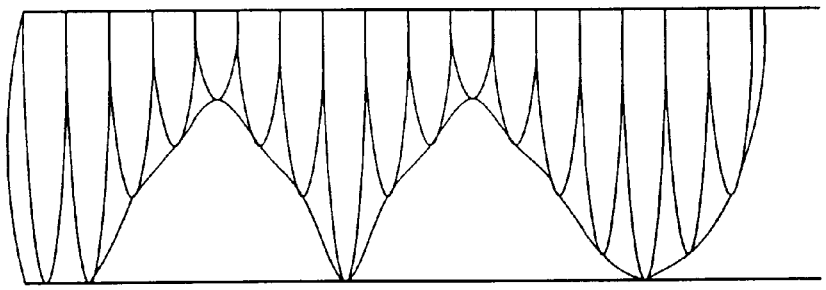
FIG. 2A
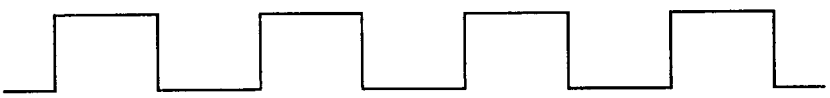
FIG. 2B
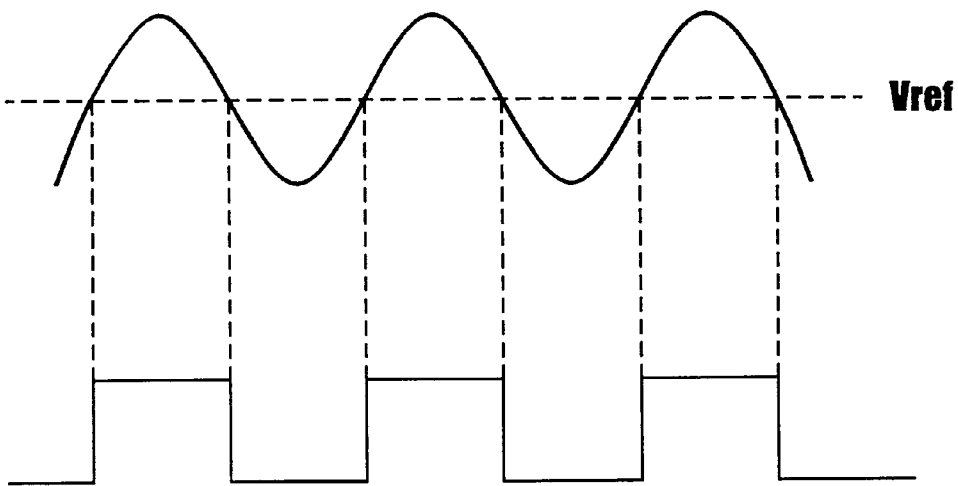
FIG. 2C
FIG. 2D

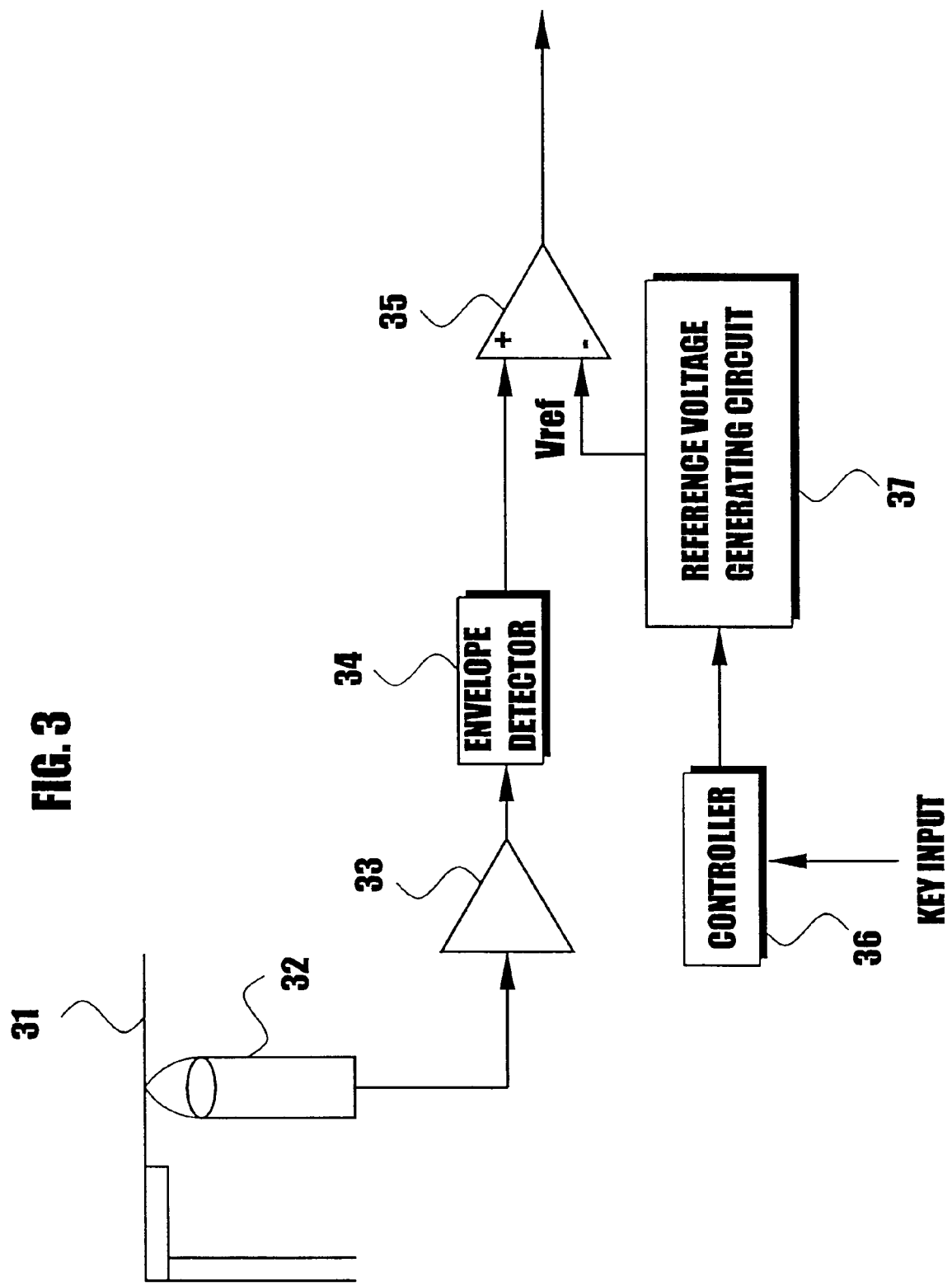

APPARATUS AND METHOD FOR ADJUSTING A REFERENCE VOLTAGE TO DETECT A TRAVERSE SIGNAL BASED ON THE TYPES OF OPTICAL MEDIUM

This application is a divisional of co-pending application No. 08/890,754, filed on Jul. 11, 1997, the entire contents of which are hereby incorporated by reference.

FIELD OF THE INVENTION

The invention relates to an optical system, and more particularly, relates to a track traverse signal detecting circuit of an optical disc player, which allows detection of an accurate track traverse signal by adjusting a level of a reference value for shaping a radio frequency (RF) envelope signal based on a Compact Disc or a Digital Video Disc.

BACKGROUND OF THE INVENTION

Generally, in an optical system, a pickup emits laser light to a disc, receives light reflected from the disc, and then reads data recorded on the disc. At this time, the pickup converts the reflected light into a radio frequency signal and outputs the converted radio frequency signal. The radio frequency signal output from the pickup is then processed by an appropriate signal processor. As a result, a tracking error signal, etc. is generated.

In a conventional optical system, when a pickup jumps tracks or randomly accesses tracks desired track, the pickup spot traverses the tracks. A microcomputer calculates the number of tracks to be traversed and controls the pickup to move to the desired tracks.

FIG. 4 is a block diagram of a traverse servo in the optical disc system in prior art. When a pickup 42 jumps tracks or randomly accesses a desired track, the pickup 42 traverses certain tracks of the disc 41. A number of tracks to be tranversed is calculated in a microcomputer 46. The pickup 42 also reads data recorded on a disc 41 and outputs a radio frequency (RF) signal. The RF signal is fed to a RF amplifier 43 and a tracking error (TE) generating circuit 45. The amplified RF signal output from the RF amplifier 43 and the TE signal TE output from signal generating circuit 45 are fed to a track traverse detecting circuit 44. The track traverse detecting circuit 44 outputs a track traverse signal Cout. The microcomputer 46 receives the track traverse signal Cout and calculates the number of tracks to be traversed. The microcomputer 46 commands to a tracking controller 47 to control an actuator driver 48 in a track jump mode or a random access mode and then the actuator driver 48 drives the pickup 42 to jump the tracks so as to move to the calculated desired track. The number of tracks to be traversed is calculated from pulse the of track traverse signal Cout generated in the track traverse detecting circuit 44. Then, the microcomputer 46 commands the tracking controller 47 to stop the pickup 42 on the desired track.

The radio frequency (RF) signal amplified by the RF amplifier 43 and the tracking error (TE) signal generated by the TE signal generating circuit 45 are used in generating the track traverse signal Cout in a jump mode. The TE signal and the RF signal may be used as the track traverse signal Cout. However, both signals are used in generating the track traverse signal compensating each other because the track traverse signal Cout is generated every time the pickup 42 light spot traverses one track.

FIG. 5 is a block diagram of a RF signal processing circuit in the track traverse signal detecting circuit 44. An envelope detector 51 detects conventional RF envelope signal from the recevied RF signal. The RF envelope signal is fed to a wave shaping circuit 52. The wave shaping circuit 52 compares the RF envelope signal with a predetermined constant reference voltage and outputs a shaped RF envelope signal. The shaped RF envelope signal is used for a first track traverse signal since its pulse is generated corresponding to the traversed track. To obtain a precise track traverse signal, the TE signal is used as a second track traverse signal at the same time.

However, when the conventional optical system is used for an optical disc player for playing compact discs (CD) both or (DVD)s, since the (DVD) have a narrower pitch than the CDs, the amplitude of the RF envelope signal of the DVDs is smaller than that of the RF envelope signal of the CDs.

The different amplitudes of the RF envelope signals of CDs and DVDs cause problems with the conventional optical system where the level of a reference voltage Vref for generating the first track traverse signal is fixed to a predetermined reference level according to the pitch of the CDs. Thus, the first track traverse signal is not accurately generated if DVDs are used. This means that the microcomputer 46 is incapable of accurately counting the number of track to be traversed at all times. Therefore, to correct the unreliability of the conventional optical system, a reference voltage Vref capable of being adjusted according to the use of CD or DVDs in needed.

SUMMARY OF THE INVENTION

To solve the above other problems with the conventional optical system, an object of present invention is to provide a track traverse signal detecting circuit which performs track access operation by adjusting the level of the reference voltage Vref according to the CDs or DVDs and generating the exact track traverse signal.

To achieve the above and other objects, one aspect of the present invention is to provide a track traverse signal detecting circuit which comprises a pickup for reading data recorded on a disc and outputting a radio frequency signal; a radio frequency signal processing means for receiving the radio frequency signal from the pickup and amplifying the radio frequency signal and detecting a RF envelope signal from the amplified radio frequency signal; a tracking error signal generating means for generating a track error signal; a first track traverse signal generating means for generating a first track traverse signal based on the tracking error signal; a control means for monitoring the second track traverse signal using the first track traverse signal and outputting a signal for a reference voltage level; a reference voltage generating means for generating the reference voltage Vref based on the reference voltage level signal; and a second track traverse signal generating means for generating a second track traverse signal based on RF envelope signal and the reference voltage Vref.

The first track traverse signal generating means according to the present invention may comprise an amplifier for amplifying the tracking error signal output from the tracking error signal generating means; and a comparing means for comparing the tracking error signal with a ground voltage and outputting a high level voltage when the tracking error signal is larger than the ground voltage and a low level voltage when the tracking error signal is smaller than or equal to the ground voltage.

The second track traverse signal generating means according to the present invention may include a comparing means for comparing the RF envelope signal with the reference voltage Vref and outputting a high level voltage when the RF envelope signal is larger than the reference voltage Vref and a low level voltage when said RF envelope signal is smaller than or equal to the reference voltage Vref.

The control means according to the present invention may adjust the second track traverse signal's frequency to be equal to the first track traverse signal's frequency.

The control means may further adjust the phase of the track traverse signal based on the first track traverse signal to ensure a 90 degree shift between the phase of the second track traverse signal and that of the first track traverse signal.

In addition, the control means calculates a mean value of the second track traverse signal and outputs a control signal to the reference voltage generating means so as to generate a reference voltage Vref based on the mean value.

Another aspect of the present invention is to provide a track traverse signal detecting circuit which comprises a pickup for reading data recorded on a disc and outputting a radio frequency signal; a radio frequency signal processing means for receiving the radio frequency signal from the pickup and amplifying the radio frequency signal and detecting a RF envelope signal from the amplified radio frequency signal; a control means for determining whether the disc is a Compact Disc or a Digital Video Disc and outputting a signal of a reference voltage level; a reference voltage generating means for generating a reference voltage Vref based on the signal of the reference voltage level; and a comparing means for comparing the RF envelope signal with the reference voltage and outputting a track traverse signal.

Other and further objects, features and advantages of the invention will appear more fully from the following description.

BRIEF DESCRIPTION OF THE DRAWINGS

A detailed description of this invention is given below with reference to the accompanying drawings.

FIG. 2a, 2b, 2c, and 2d illustrate signal waveforms generated by the respective operation of FIG. 1 at stages a, b, c, and d.

FIG. 3 is a block diagram of the track traverse signal detecting circuit according to a second embodiment of the present invention.

DESCRIPTION OF THE PREFERRED EMBODIMENTS

Figure 1:
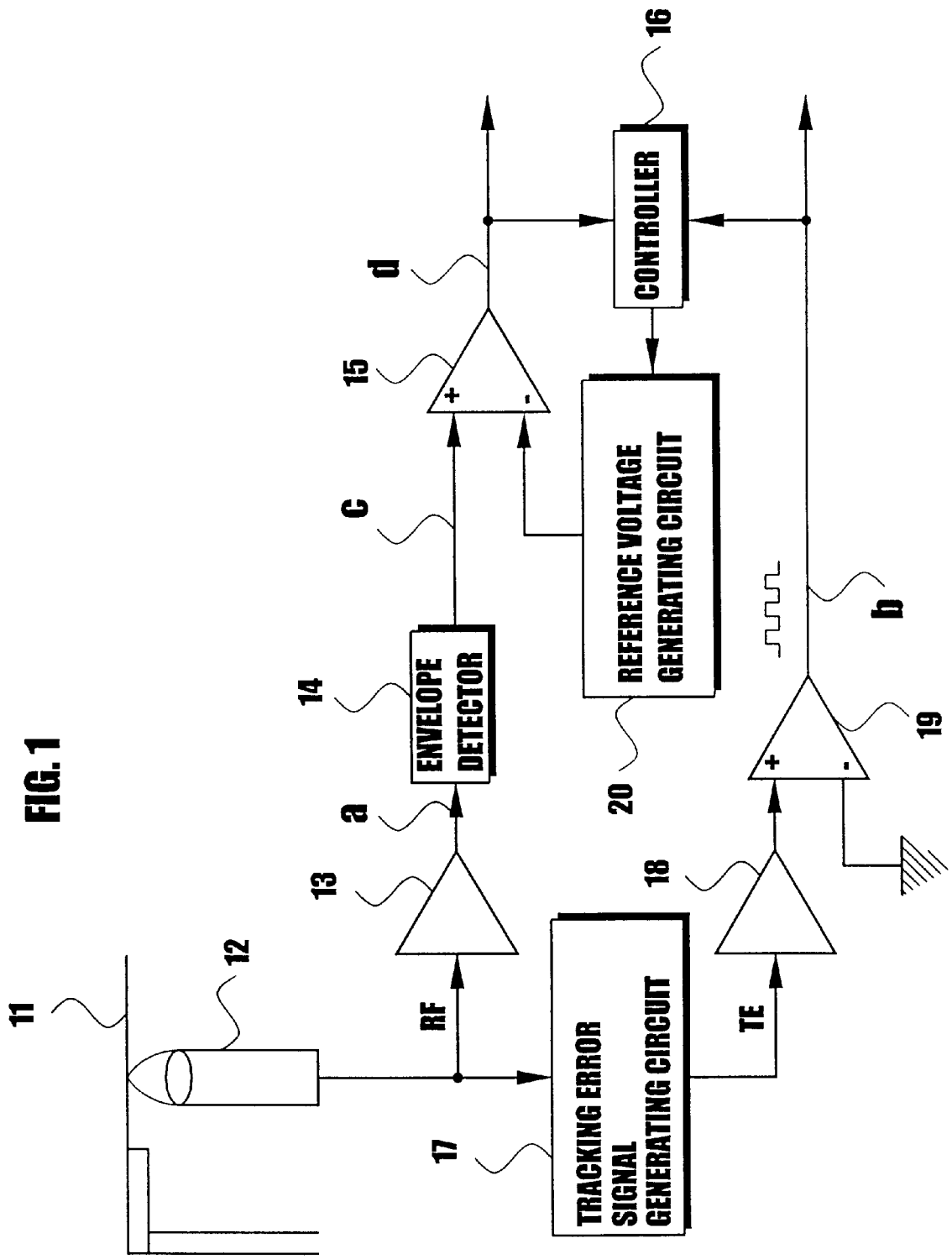
FIG. 1 is a block diagram of the track traverse signal detecting circuit according to a first embodiment of the present invention.
Figure 4:
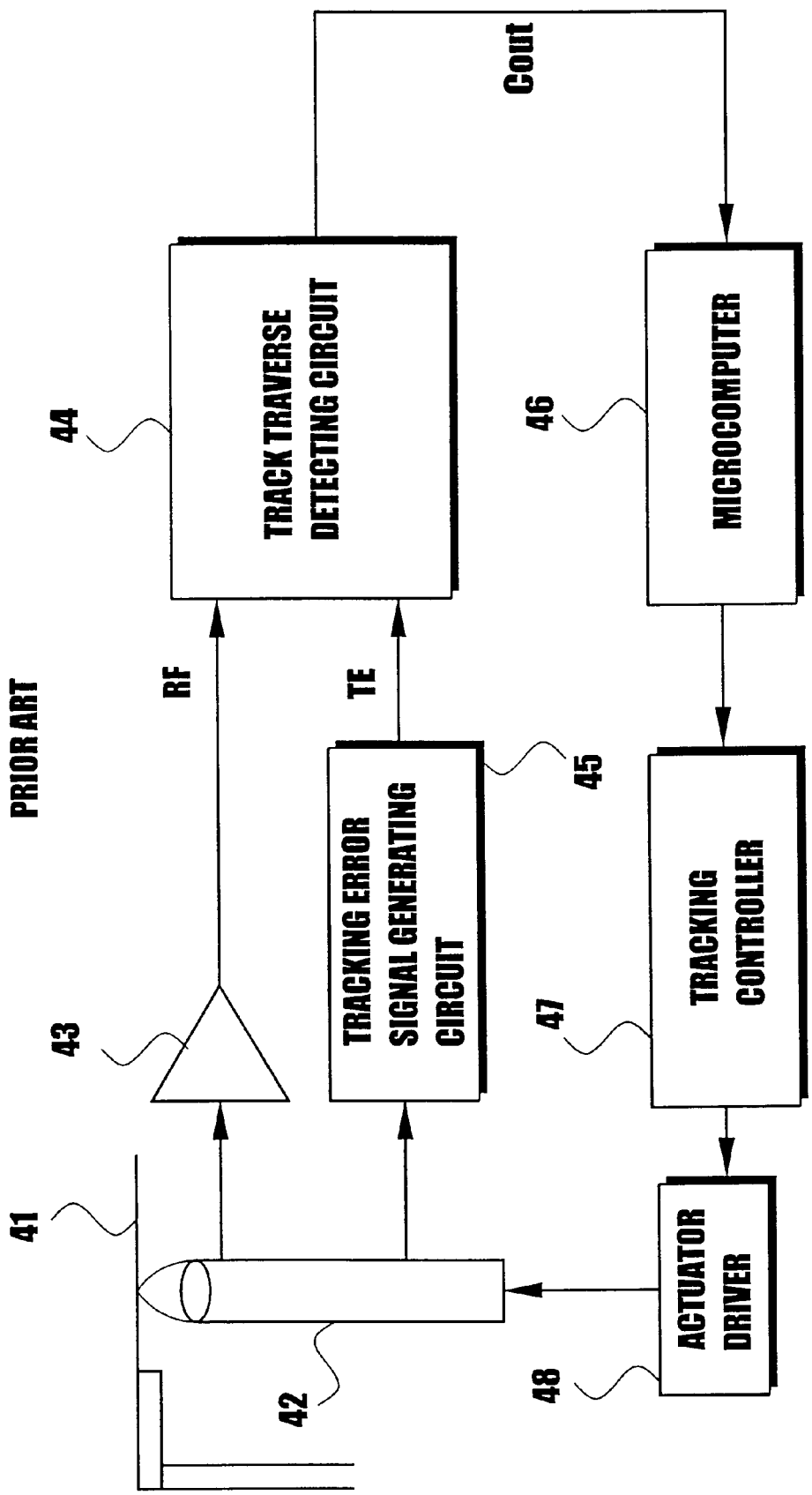
FIG. 4 is a block diagram of a conventional tracking servo system in the optical disc player art.
Figure 5:
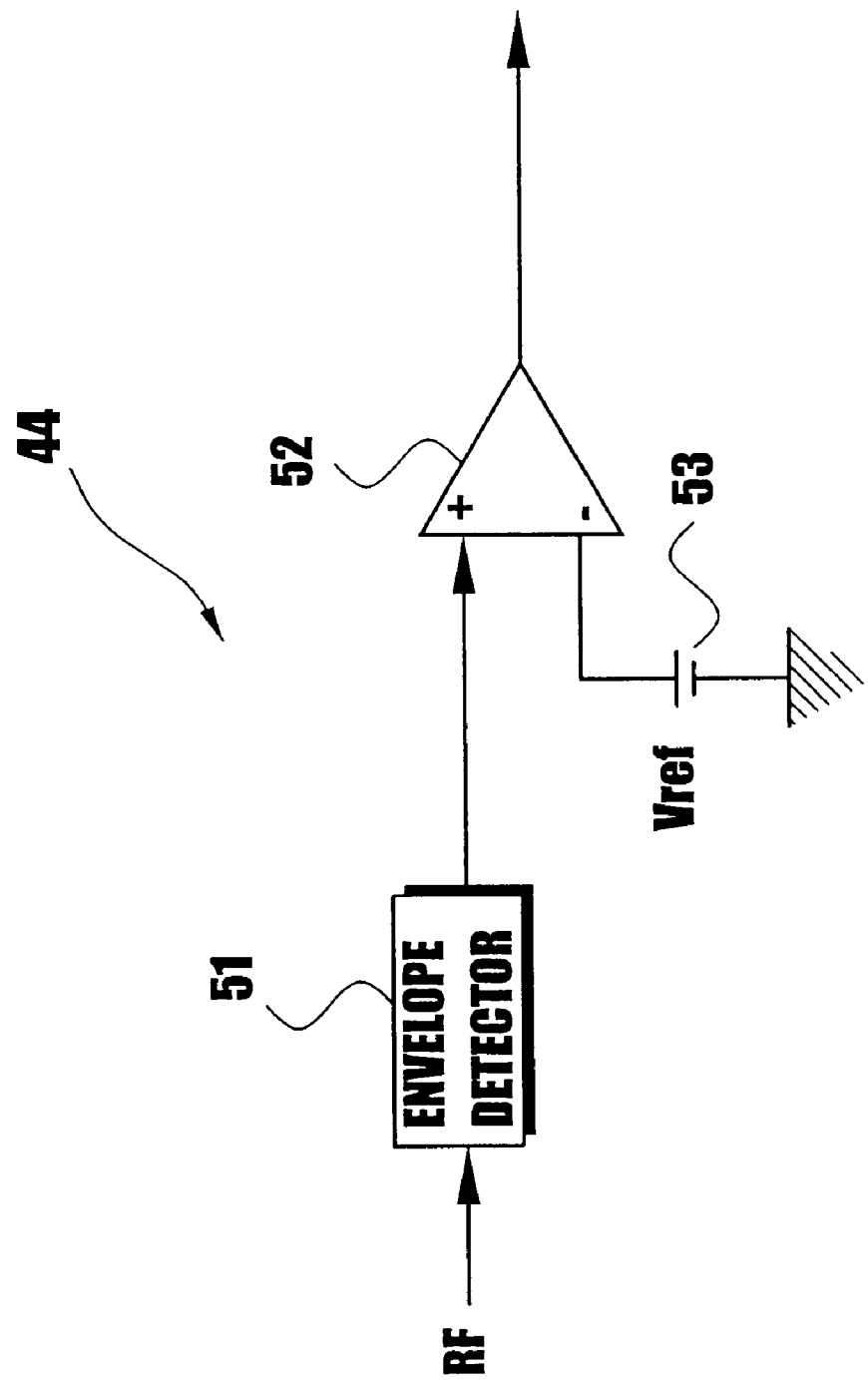
FIG. 5 is a block diagram of a RF signal processing circuit in the track traverse signal detecting circuit in a prior art.

FIG. 1 is a block diagram of a track traverse signal detecting circuit according to the first embodiment of the present invention. As shown, the track traverse signal detecting circuit comprises an optical pickup 12 which emits a laser light or the like to a disc 11, receives the light reflected from the disc 11, and reads data recorded on the disc 11; a tracking error Cout signal generating circuit 17 for generating a tracking error signal; a radio frequency amplifier 13 for amplifying a radio frequency signal RF output from the pickup 12; an envelope detector 14 for detecting a RF envelope signal from the amplified signal; an amplifier 18 for amplifying the tracking error signal output from the tracking error signal generating circuit 17; a first comparator 19 which compares the output signal of the amplifier 18 with a ground voltage and outputs a first track traverse signal in a rectangular waveform; a second comparator 15 which compares the RF envelope signal with a reference voltage Vref and outputs a second track traverse signal in a rectangular waveform; a controller 16 for receiving an output signal from the second comparator 15 and output signal from the first comparator 19, and outputting a signal for controlling the reference voltage Vref; and a reference voltage generating circuit 20 for generating the reference voltage Vref based on a signal output from the controller 16.

The operation of the circuit according to this invention is explained hereinafter with reference to FIGS. 1 and 2.

First, the pickup 12 emits light to the disc 11, receives the light reflected from the disc 11, and outputs the radio frequency signal RF. The radio frequency signal RF output from the pickup 12 is sent to the radio frequency amplifier 13 and the tracking error signal generating circuit 17.

Thereafter, the radio frequency amplifier 13 amplifies the radio frequency signal RF output from the pickup 12, and outputs the amplified signal to the envelope detector, in a waveform as illustrated in FIG. 2a.

Next, the envelope detector 14 detects the RF envelope signal in a sine waveform from the amplified signal of the radio frequency amplifier 13. The RF envelope signal is sent to the second comparator 15, in a waveform as illustrated in FIG. 2c.

The second comparator 15 has an inverse in put terminal (−) supplied with the reference voltage Vref and the non-inverse input terminal (+) supplied with the RF envelope signal. The second comparator 15 compares the RF envelope signal with the reference voltage Vref. The second comparator 15 outputs either a high level output or low level output depending on, respectively, whether the RF envelope signal is larger than, or smaller than or equal to the reference voltage Vref. As a result, the second comparator 15 outputs the second track traverse signal in rectangular waveform, as illustrated FIG. 2d. Thus, the reference voltage Vref input to the second comparator 15 is the reference level for shaping the RF envelope signal.

Meanwhile, the tracking error signal generating circuit 17 receives the radio frequency signal RF from the pickup 12 and generates the tracking error signal. Thereafter, the amplifier 18 amplifies the tracking error signal and outputs the amplified signal TE the first comparator 19.

Next, the first comparator 19 has an inverse input terminal (−) supplied with a ground voltage and a non-inverse input terminal (+) supplied with the tracking error signal TE. The first comparator 19 compares the amplified signal of the first comparator 19 with the ground voltage. If the tracking error signal TE is large than the ground voltage, the first comparator 19 outputs a high level output. If the tracking error signal TE is smaller than or equal to the ground voltage, the first comparator 19 outputs a low level output. Further the low level output or the high level output from the first comparator 19 is the first track traverse signal in a rectangular waveform, as illustrated FIG. 2*b*. The first track traverse signal is then fed to the controller 16.

The controller 16 receives the second track traverse signal output from the second comparator 15 and the first track traverse signal output from the first comparator 19, and outputs a signal for controlling the reference voltage Vref.

Next, the reference voltage generating circuit 20 generates the reference voltage Vref based on the signal output from the controller 16.

The operation of the controller 16 for controlling the reference voltage Vref is performed as follows.

First, the controller 16 receives the second track traverse signal output from the second comparator 15, evaluates a maximum value and a minimum value of the second track traverse signal and obtains a mean value. The mean value becomes the value of the reference voltage Vref. The controller 16 outputs a control signal to the reference voltage generates as to generating circuit the reference voltage Vref. In this case, the reference voltage Vref is always located at the center of the RF envelope signal even though the amplitude of the RF envelope signal is changed according to a type of the disc.

Second, the controller 16 also detects a duty ratio of the second track traverse signal output from the comparator 15 and then controls the reference voltage Vref so that the duty ratio is 50:50. If the second track traverse signal is shaped from the RF envelope signal with a proper reference voltage, the duty ratio of the track traverse signal becomes 50:50. Therefore, the controller 16 controls the reference voltage Vref by checking the duty ratio of the second track traverse signal.

Thirdly, the controller 16 evaluates the frequency of the first track traverse signal and frequency. The of the second track traverse signal and controls the reference voltage Vref so that the frequency of the first track traverse signal is equal to the frequency of the second track traverse signal. If the second track traverse signal is generated by the second comparator 15 with using a proper reference voltage Vref the frequency of the first track traverse signal and the frequency of the second track traverse signal should be the same because both the first track traverse signal and the second track traverse signal are generated at the same tracks.

Fourthly, the controller 16 a detects phase difference between the first track traverse signal and the second track traverse signal and then controls the reference voltage Vref so that the phase difference is 90 degrees. If the second track traverse signal is generated by the second comparator 15 with a proper reference voltage Vref the phase difference between the first and second track traverse signals becomes 90 degrees because the second track traverse signal is followed 90 degrees after the first track traverse signal.

In case of a track jump or random access, since the first comparator 19 outputs the exact first track traverse signal using the tracking error signal TE the controller 16 controls the reference voltage Vref based on the first track traverse signal FIG. 3 is a block diagram of a track traverse signal detecting circuit according to the second embodiment of the present invention. As shown, the track traverse detecting circuit of the second embodiment comprises an optical pickup 32 which emits light to a disc 31, receives the light reflected from the disc 31, and reads data recorded on the disc 31; a radio frequency amplifier 33 for amplifying a radio frequency signal RF output from the pickup 32; an envelope detector 34 for detecting RF envelope signal from the amplified signal; a controller 36 for determining whether the disc 31 is a CD or a DVD and outputting a control signal accordingly; a reference voltage generating circuit 37 for generating a reference voltage Vref based on the control signal; and a comparator 35 which compares the RF envelope signal output from the envelope detector 34 with the reference voltage Vref and outputs a track traverse signal.

The operation of the circuit of the second embodiment according to this invention is explained hereinafter.

First, the optical pickup 32 emits light to the disc 31, receives the light reflected from the disc 31, and outputs the radio frequency signal RF to the radio frequency amplifier 33. The radio frequency amplifier 33 amplifies the radio frequency signal RF and outputs the amplified signal to the envelope detector 34. Thereafter, the envelope detector 34 detects the RF envelope signal in sine waveform from the amplified signal.

The comparator 35 has an inverse input terminal (−) supplied with the reference voltage Vref and a non-inverse input terminal (+) supplied with the RF envelope signal from the envelope detector 34. The comparator 35 compares the RF envelope signal with the reference voltage Vref and outputs the track traverse signal in rectangular waveform. That is, the reference voltage Vref input to the comparator 35 is the reference level for shaping the RF envelope signal.

Meanwhile, the controller 36 determines whether the disc 31 is a Compact Disc or a Digital Video Disc by a key input of a user or signals read from the disc 31, generates a control signal based on the determination, and outputs the control signal to the reference voltage generating circuit 37.

Next, the reference voltage generating circuit 37 generates the reference voltage Vref according to the control signal output from the controller 36.

Since the track pitch of a Digital Video Disc is smaller than that of a Compact Disc, the amplitude of the RF envelope signal of a Digital Video Disc is smaller than that of the RF envelope signal of a Compact Disc. Therefore, the controller 36 controls the reference voltage generating circuit 37 so as to generate either a reference voltage Vref1 or a reference voltage Vref2 which is smaller than the reference voltage Vref1 based on, respectively whether the disc is a Compact Disc or a Digital Video Disc.

As described above, the track traverse signal detecting circuit according to the first embodiment of the present invention controls the level of the reference voltage Vref by calculating a mean value of the second track traverse signal, or adjusting the frequency or the phase of second track traverse signal. Therefore, in case of track jump or random access, the track access operation can be performed accurately.

The track traverse signal detecting circuit according to the second embodiment of the present invention determines whether the disc is a CD or a DVD, and controls the level of the reference voltage, Vref based on the determination and then exactly detects the accurate track traverse signal. Although it is disclosed that the present invention determines whether an optical disc is a CD or a DVD, determination of other types of recording medium is contemplated as part of the invention. Therefore, in case of a track jump or random access, the track access operation can be performed accurately.

As will be evident to those skilled in the art, various modifications of this invention can be made or followed in light of the foregoing disclosure without departing from the spirit of the disclosure or from the scope of the accompanying claims.

What is claimed is:

1. A track traverse signal detecting apparatus comprising:
   a pickup for reading data recorded on an optical medium and outputting a radio frequency signal;
   a radio frequency signal processing unit for receiving said radio frequency signal from said pickup, amplifying said radio frequency signal and detecting a RF envelope signal from the amplified radio frequency signal;
   a tracking error signal generating unit for generating a track error signal;
   a first track traverse signal generating unit for generating a first track traverse signal based on said tracking error signal;
   a second track traverse signal generating unit for generating a second track traverse signal based on a range which the RF envelope signal varies and a reference level;
   a control unit for monitoring said second track traverse signal using said first track traverse signal and outputting a control signal; and
   a reference level generating unit for generating the reference level, used in generating the second track traverse signal, based on said control signal, wherein said control unit reads a duty ratio of said second track traverse signal and outputs the control signal to said reference level generating unit so as to cause the duty ratio of said second track traverse signal to tend toward approximately 50:50.

2. A track traverse signal detecting apparatus comprising:
   a pickup for reading data recorded on an optical medium and outputting a radio frequency signal;
   a radio frequency signal processing unit for receiving said radio frequency signal from said pickup and detecting a RF envelope signal from the radio frequency signal;
   a track traverse signal generating unit for generating a track traverse signal based on a range which the RF envelope signal varies and a reference level;
   a control unit for monitoring said track traverse signal and outputting a control signal; and
   a reference level generating unit for generating the reference level, used in generating the track traverse signal, based on said control signal.

3. The track traverse signal detecting apparatus according to claim 2, wherein said control unit calculates a mean value of the track traverse signal and outputs the control signal to said reference level generating unit so as to generate the reference voltage based on said mean value.

4. The track traverse signal detecting apparatus according to claim 2, wherein said control unit reads a duty ratio of said track traverse signal and outputs the control signal to said reference level generating unit so as to cause the duty ratio of said track traverse signal to tend toward approximately 50:50.

5. A track traverse signal detecting apparatus comprising:
   pickup for reading data recorded on an optical medium and outputting a radio frequency signal;
   a radio frequency signal processing unit for receiving said radio frequency signal from said pickup and detecting a RF envelope signal from the radio frequency signal;
   a track traverse signal generating unit for generating a track traverse signal based on a range which the RF envelope signal varies and a reference level;
   a control unit for determining a type of the optical medium and outputting a control signal; and
   a reference level generating unit for generating the reference level, used in generating the track traverse signal, based on said control signal.

6. The track traverse signal detecting apparatus according to claim 5, wherein the control unit receives signals read from the optical medium to determine the type of the optical medium.

7. A method of detecting a track traverse signal comprising the steps of:
   reading data recorded on an optical medium;
   outputting a radio frequency signal based on the data;
   amplifying the radio frequency signal;
   detecting a RF envelope signal from the amplified radio frequency signal;
   generating a track error signal;
   forming a first track traverse signal based on the track error signal;
   forming a second track traverse signal based on a range which the RF envelope signal varies and a reference level;
   monitoring the second track traverse signal and forming a control signal based thereon; and
   generating the reference level, used in forming the second track traverse signal, based on the control signal.

8. The method according to claim 7, wherein said step of forming a control signal includes reading a frequency of the first track traverse signal and wherein the reference level generated causes the frequency of the second track traverse signal to tend toward equaling the frequency of the first track traverse signal.

9. The method according to claim 7, wherein said step of forming a control signal includes reading a phase of the first track traverse signal and wherein the reference level generated causes the phase of the second track traverse signal to tend to be 90 degrees shifted relative to the phase of the first track traverse signal.

10. The method according to claim 7, wherein said step of forming a control signal includes calculating a mean value of the second track traverse signal and wherein said step of generating the reference level includes basing the reference level on the mean value.

11. The method according to claim 7, wherein said step of forming a control signal includes reading a duty ratio of the second track traverse signal and wherein the reference level generated causes the duty ratio of the second track traverse signal to tend toward approximately 50:50.

12. A method of detecting a track traverse signal comprising the steps of:

reading data recorded on an optical medium;

outputting a radio frequency signal based upon the data;

detecting a RF envelope signal from the radio frequency signal;

forming a track traverse signal based on a range which the RF envelope signal varies and a reference level;

monitoring the track traverse signal and forming a control signal based thereon; and generating the reference level, used in generating the track traverse signal, based on the control signal.

13. The method according to claim 12, wherein said step of forming a control signal includes calculating a mean value of the track traverse signal and wherein said step of generating the reference level includes basing the reference level on the mean value.

14. The method according to claim 12, wherein said step of forming a control signal includes reading a duty ratio of the track traverse signal and wherein the reference level generated causes the duty ratio of the track traverse signal to tend toward approximately 50:50.

15. A method of detecting a track traverse signal comprising:

reading data recorded on an optical medium;

outputting a radio frequency signal based upon the data;

detecting a RF envelope signal from the radio frequency signal;

forming a track traverse signal based on a range which the RF envelope signal varies and a reference level;

determining a type of the optical medium and outputting a control signal; and generating the reference level, used in generating the track traverse signal, based on the control signal.

16. The method according to claim 15, wherein said determining step includes receiving signals read from the optical medium indicating the type of the optical medium.

* * * * *